No. 642,551. Patented Jan. 30, 1900.
P. KENNEDY.
MECHANISM FOR DRIVING DYNAMOS FOR ELECTRIC LIGHTING ON RAILWAY CARS, &c.
(Application filed July 8, 1899.)
(No Model.)
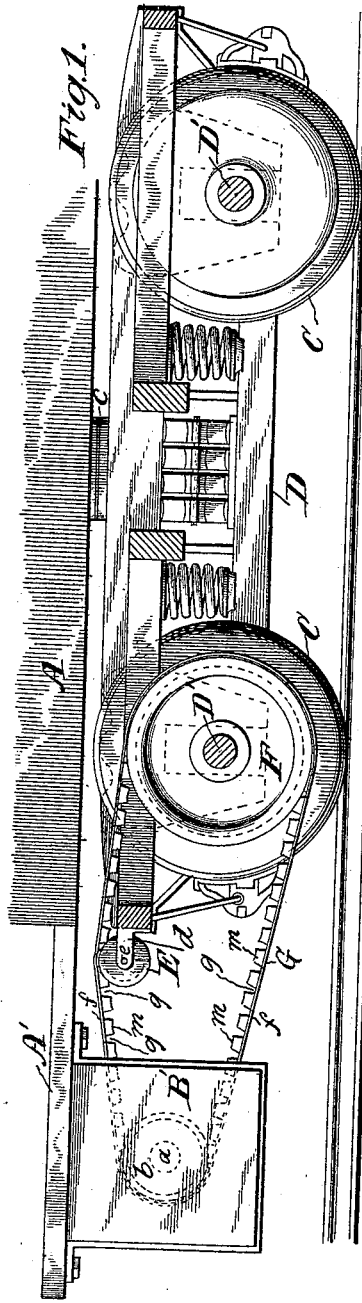
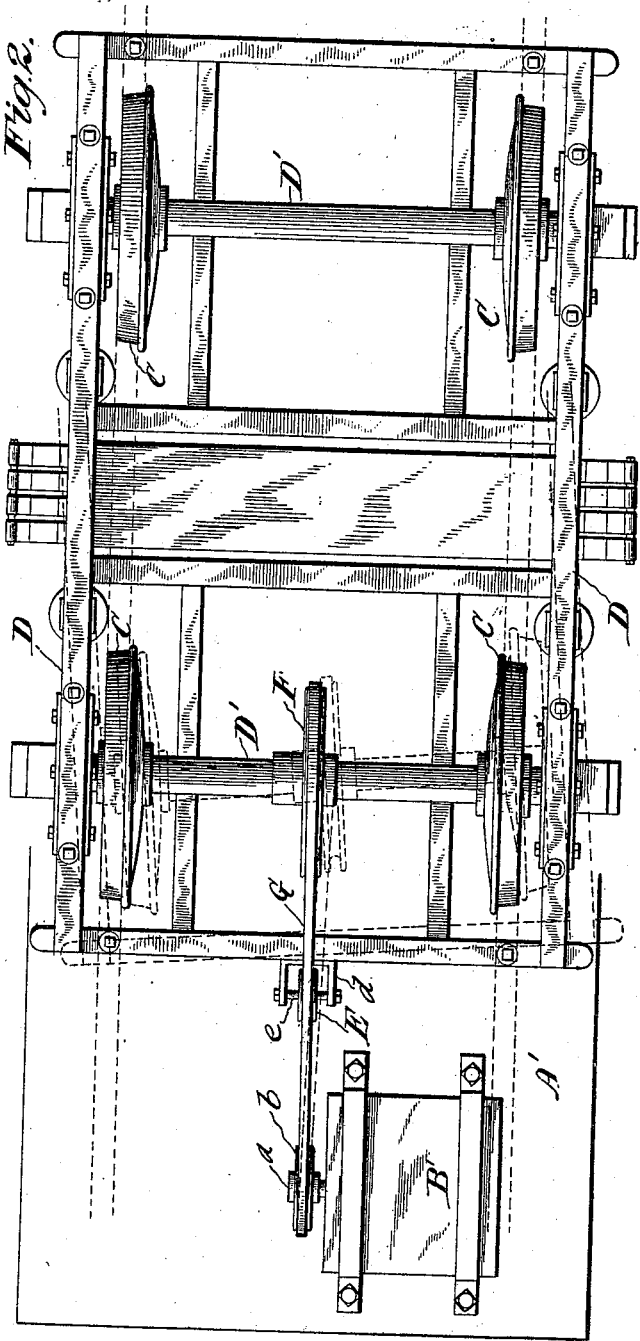
WITNESSES:
Chas. D. King.
Edward Kelly.
INVENTOR
Patrick Kennedy
BY
James A. Whitney
ATTORNEY
THE NORRIS PETERS CO., PHOTO-LITHO., WASHINGTON, D. C.

United States Patent Office.

PATRICK KENNEDY, OF NEW YORK, N. Y., ASSIGNOR TO THE COLUMBIAN ELECTRIC CARLIGHTING AND BRAKE COMPANY, OF NEW JERSEY.

MECHANISM FOR DRIVING DYNAMOS FOR ELECTRIC LIGHTING ON RAILWAY-CARS, &c.

SPECIFICATION forming part of Letters Patent No. 642,551, dated January 30, 1900.

Application filed July 8, 1899. Serial No. 723,160. (No model.)

*To all whom it may concern:*

Be it known that I, PATRICK KENNEDY, a citizen of the United States, residing in the city of New York, borough of Brooklyn, State of New York, have invented certain new and useful Improvements in Mechanisms for Driving Dynamos for Electric Lighting on Railway-Cars, &c.; and I do hereby declare that the following is a full, clear, and exact description of the same, reference being had to the accompanying drawings, making a part of this specification, in which—

Figure 1 is a vertical longitudinal sectional view of an apparatus embracing my said invention. Fig. 2 is an inverted plan view of the same. Fig. 3 is a detail view, on a larger scale, of one part thereof.

This invention relates to that class of apparatus designed for the electric illumination of railway-cars and similar vehicles by means of a dynamo operated from an axle of the vehicle, the dynamo preferably serving to charge a storage battery through and from which the electric current is supplied to electric lamps of any suitable or approved character borne by the vehicle. Heretofore in practice it has been found difficult and even impracticable to transmit the requisite power from the axle to the dynamo with such certainty and uniformity and such independence of the movements of the parts of the vehicle in turning as to insure its operation without irregularity in its action, great loss of power during its transmission, and liability to accidental derangement. My invention comprises certain new and useful combinations of instrumentalities whereby the dynamo is driven from the axle with practically a positive motion and whereby the regular and uniform transmission of power from the axle to the dynamo is provided for regardless of changes in the position of the axle with reference to the dynamo—such, for example, as those which occur when the forward truck of the car changes its relation to the body of the latter when the car is turned about in one direction or another.

A is the body of a street-car provided, preferably, with a platform A', from which is suspended, in a suitable casing B' or otherwise, a dynamo, one end of the shaft and the driven pulley of which are shown at $a$ and $b$, respectively, in Fig. 2 and in dotted outline in Fig. 1.

D is one of the trucks which supports the car-body A and which is pivotally connected therewith, the king-bolt or pivoted connection of the truck with the car-body being at $c$. The axles D' of the truck D are provided to the latter in any ordinary or appropriate way and have, of course, the wheels C. At the front of the truck D is provided a straddling-bracket $d$, which supports a shaft $e$. Loose in this shaft is an idler-pulley E, the thickness of which is less than the space between the arms of the bracket $d$, so that the idler-pulley is permitted to have a sliding movement along the shaft $e$.

Fast on the foremost of the axles D' is a pulley F, which, the wheels C being fast on the axle, rotates with the axle as the vehicle moves along. This pulley F is arranged to be as nearly as may be more or less on the same vertical plane with the pulley $b$ of the dynamo. The bracket $d$ should be so arranged that the middle portion of the shaft $e$ is in line with the pulleys F and $b$. The pulleys F and $b$ and also the idler-pulley E are circumferentially grooved or channeled, as shown in the detail view, Fig. 3, the circumferential groove in each case being angular or V-shaped and adapted to secure the cogs of the driving-band hereinafter described. Extended over the pulleys F and $b$ in such a way that the pulley $b$ is rotated from the pulley F is a band G, which in its structure is especially calculated for coaction with the grooved pulleys F, $b$, and E. In other words, this band comprises a flat belt $f$, which upon its inner or working surface is provided with a system of cogs $m$, which have between them along the length of the belt spaces $g$, which permit the transverse sides of the cogs to approach and recede from each other as the band bends and straightens in passing over and transmitting motion from the one pulley to the other. The lateral surfaces of the cogs are sloped so as to give the cogs a cross-section corresponding to that of the angular V-shaped grooves in the three pulleys, as illustrated in Fig. 3. The arrangement of the idler-pulley E is such that the band G is held by it under the degree of tension requisite to its effective traction upon the pulleys F and b.

When the vehicle travels straight ahead, the idler-pulley E is brought into the same vertical plane, or practically so, with the pulleys F and b and coöperates with those pulleys and with the band G, as explained. If the idler-pulley were immovable in lateral directions, the deviation in the direction of the movement of the truck from that of the car-body, which occurs in turning the vehicle and which brings the pulley F to an angle with the line of travel of the band, would throw the band from the idler, with the result of slackening the belt and destroying its power to transmit motion from the pulley on the axle to the pulley on the dynamo-shaft; but by providing for a lateral movement of the idler-pulley along its shaft e the idler-pulley is automatically carried by the belt itself to a position in which it is substantially in line with the two pulleys F and b, so that its displacement from the idler becomes practically impossible, the motion that otherwise would tend to throw the band from the idler-pulley being directed to the different purpose of changing the positions of the idler-pulley, so that there is no tendency to strip the band from said pulley. It will be observed that in order to accomplish this the band must itself exert a lateral pressure upon the pulley to move it along upon the shaft e and in so doing must overcome an appreciable degree of resistance. It is to meet these conditions that the pulleys E, F, and b are made with the deep V-shaped circumferential grooves, as described, with the band constructed with the cogs, which in their cross-section correspond in shape to said grooves, so that not only does the band hug the increased bearing-surfaces provided by the grooves, and thereby increase the tractive power of the band, but the broad sides of the grooves provide, so to speak, continuous shoulders, against which the broad sides of the cogs bear laterally, and are thus enabled to push the idler-pulley along its shaft e with a much more positive action than would be possible with any other construction.

By the means described the tension of the band upon the pulleys F and b is maintained, notwithstanding changes in position of the truck with reference to the car-body and to the dynamo carried thereby. This insures a uniform transmission of power and motion to the dynamo, with a consequent and proportionate steadiness in the operation of the lighting apparatus supplied with a current primarily from the dynamo.

The lighting apparatus may be of any preferred character suited for operation upon a movable vehicle and adapted to receive its current from a dynamo.

What I claim as my invention is—

1. The combination with a car-body having suspended therefrom a dynamo, the shaft of which carries a pulley which has a circumferential V-shaped groove, of a truck which supports and is pivotally connected with the car-body, and which has upon its axle a pulley which has a circumferential V-shaped groove corresponding to that of the pulley on the dynamo-shaft, a correspondingly-grooved idler-pulley on the truck and movable laterally at the end of the truck nearest the dynamo, and a driving-band composed of a belt provided on its working face with cogs having spaces between them along the length of the belt and V-shaped in their cross-section to fit into and hug the surfaces of the grooves in the specified pulleys and to bear laterally against said surfaces to move the idler-pulley when the angle of the band with reference to the dynamo-shaft is changed, substantially as herein set forth.

2. The combination with a car-body having a dynamo suspended therefrom and having on the dynamo-shaft a pulley provided with a circumferential V-shaped groove, of a truck supporting and pivotally connected with the car-body and having upon its axle a pulley which has a circumferential V-shaped groove corresponding to that of the pulley on the dynamo-shaft, a bracket provided at the end of the truck, a transverse shaft supported by the bracket, an idler-pulley arranged to move laterally along the said shaft and having a V-shaped circumferential groove corresponding to those of the pulleys on the dynamo-shaft and the axle, and a driving-band composed of a belt provided with cogs having spaces between them along the length of the belt and V-shaped in their cross-section to hug the surfaces of the grooves of the several pulleys and to bear laterally against said surfaces to move the idler-pulley along the shaft of the bracket when the angle of the band with reference to the dynamo-shaft is changed, substantially as herein set forth.

PATRICK KENNEDY.

Witnesses:
JAMES A. WHITNEY,
GEO. HARRISON MCADAM.